Patented Sept. 26, 1933

1,928,266

UNITED STATES PATENT OFFICE 1,928,266

PROCESS FOR THE PRODUCTION OF AMMONIUM SULPHATE

Ludwig Rosenstein, San Francisco, Calif., assignor to Shell Development Company, San Francisco, Calif., a corporation of Delaware No Drawing. Application April 2, 1930
Serial No. 441,175

17 Claims. (Cl. 23—119)

This invention relates to an improved method for the production of ammonium sulphate.

At the present time ammonium sulphate is made either from synthetic ammonia or from the gases of coke ovens, and the sulphate radical is supplied by sulphuric acid or by some form of calcium sulphate.

My method, on the other hand, of producing ammonium sulphate uses neither sulphuric acid nor calcium sulphate but makes direct use of sulphur dioxide produced either through the burning of sulphur or by the roasting of ores or by any other means.

I am familiar with the publication of the Bureau of Mines, known as Bulletin 260 of the Department of Commerce, by Charles G. Maier which describes "The ferric sulphate-sulphuric acid process", and I am also aware of the contents of the U. S. Patent No. 1,477,965 issued to E. S. Leaver, December 18, 1923. In both of these publications a process is described whereby sulphur dioxide mixed with oxygen-bearing gases may be converted into a dilute solution of sulphuric acid by bubbling the gases through the solution containing ferrous and ferric sulphate. This process is not part of my invention.

What I have found possible and what has not been hitherto practiced, is the production of ammonium sulphate by adding ammonia either in the gaseous form or in the form of its concentrated solution to the solution wherein sulphuric acid is being formed from sulphur dioxide.

In order to carry out such production successfully, certain conditions must be maintained. Among these are:

(a) The acidity of the solution wherein sulphur dioxide is being oxidized must never be reduced to the point where insoluble ferrous or ferric compounds will separate therefrom.

(b) The concentration of free sulphuric acid must not exceed the concentration where acid ammonium sulphate would crystallize. Approximately seventeen percent is the upper limit of allowable free sulphuric acid.

(c) The concentration of iron compounds in the solution must be sufficiently low so that neither ferrous ammonium sulphate nor ferric alum will separate. Approximately three-tenths percent total iron is the upper limit of allowable iron concentration.

In practicing my invention it is naturally desirable to maintain a temperature such that the maximum rate of ammonium sulphate production will be maintained.

In general, my process can be carried out by bubbling sulphur dioxide-containing gases and oxygen-bearing gases through an acid aqueous solution containing catalytic material such as ferrous and ferric ions. The amount of total iron present, when employed as catalytic material, must not exceed that concentration above which ferrous ammonium sulphate or ferric alum will separate. The acidity of the solution is maintained between the lower limit (a) and the upper limit (b) by the continual addition of ammonia to the solution thus preventing either the precipitation of insoluble ferrous or ferric compounds therefrom or the crystallization of acid ammonium sulphate.

As ammonium sulphate is formed by the addition of ammonia it may be removed by any of the well-known means such as filters or centrifugal machines or it may be desirable to keep all ammonium sulphate in solution in the primary reaction vessel and then cause it to crystallize in another container by means of cooling or evaporation or both; using for this purpose any of the well known devices such as coil coolers, vacuum coolers and the like.

The reaction between sulphur dioxide and oxygen to produce sulphuric acid liberates an amount of heat sufficient to keep the solution wherein the reaction is taking place elevated somewhat above air temperature; but when ammonia is added a further liberation of heat takes place which may raise the temperature to an undesirable degree. I therefore provide means of controlling the temperature during reaction.

Considerable advantage is gained by mixing the sulphur dioxide bearing gases with oxygen, where this is cheaply available, or with air and oxygen, so as to gain a higher oxygen concentration. The reaction rate is then considerably greater and hence greater production from any given size of equipment may be attained.

I claim:

1. A process for the production of ammonium sulphate which comprises oxidizing sulphur dioxide in an acid aqueous medium in the presence of a soluble metallic salt, acting as a catalyst, which remains in solution when the solution is acid and whose hydroxide is relatively insoluble in an alkaline medium, substantially neutralizing the sulphuric acid formed with ammonia and recovering solid ammonium sulphate.

2. A process for the production of ammonium sulphate which comprises oxidizing sulphur dioxide in an acid aqueous medium in the presence of soluble metallic salts, acting as catalysts, which remain in true solution when the solution is acid and which are not in true solution when the solution becomes alkaline, substantially neutralizing the sulphuric acid formed with ammonia and recovering ammonium sulphate.

3. A process for the production of ammonium sulphate which comprises oxidizing sulphur dioxide in an acid aqueous medium in the presence of a soluble metallic salt, acting as a catalyst, which remains in solution when the solution is acid and which forms a precipitate when the solution becomes alkaline, substantially neutralizing the sulphuric acid formed with ammonia and recovering solid ammonium sulphate.

4. A process for the production of ammonium sulphate which comprises oxidizing sulphur dioxide in an acid aqueous medium in the presence of a soluble metallic salt, acting as a catalyst, which remains in solution when the solution is acid and whose hydroxide is relatively insoluble in an alkaline medium, simultaneously substantially neutralizing sulphuric acid formed with ammonia and recovering solid ammonium sulphate.

5. A process for the production of ammonium sulphate which comprises oxidizing sulphur dioxide in aqueous sulphuric acid in the presence of a soluble metallic salt, acting as a catalyst, which remains in solution when the solution is acid and whose hydroxide is relatively insoluble in an alkaline medium, maintaining the concentration of free sulphuric acid below 17% by substantially neutralizing the acid formed with ammonia and recovering solid ammonium sulphate.

6. A process for the production of ammonium sulphate which comprises catalytically oxidizing sulphur dioxide in an acid aqueous medium containing dissolved ferrous and ferric salts, substantially neutralizing the sulphuric acid formed with ammonia and recovering solid ammonium sulphate.

7. A process for the production of ammonium sulphate which comprises catalytically oxidizing sulphur dioxide in an acid aqueous medium containing dissolved ferrous and ferric salts and whose total iron concentration is less than three-tenths per cent, substantially neutralizing the sulphuric acid formed with ammonia and recovering solid ammonium sulphate.

8. A process for the manufacture of ammonium sulphate which comprises oxidizing sulphur dioxide in an acid aqueous medium substantially saturated with ammonium sulphate in the presence of a soluble metallic salt, acting as a catalyst, which remains in solution when the solution is acid and whose hydroxide is relatively insoluble in an alkaline medium, substantially neutralizing the sulphuric acid formed with ammonia and recovering solid ammonium sulphate.

9. A process for the production of ammonium sulphate which comprises oxidizing sulphur dioxide in an acid aqueous medium in the presence of a soluble metallic salt, acting as a catalyst, which remains in solution when the solution is acid and whose hydroxide is relatively insoluble in an alkaline medium, substantially neutralizing sulphuric acid formed with ammonia so that the free sulphuric acid concentration does not substantially exceed 17%, and recovering solid ammonium sulphate.

10. A process for the production of ammonium sulphate which comprises oxidizing sulphur dioxide in an acid aqueous medium in which the concentration of free acid is kept below that which would cause a separation of an acid ammonium sulphate in the presence of a soluble metallic salt, acting as a catalyst, which remains in solution when the solution is acid and whose hydroxide is relatively insoluble in an alkaline medium, substantially neutralizing the sulphuric acid formed with ammonia and recovering solid ammonium sulphate.

11. A process for the production of ammonium sulphate which comprises catalytically oxidizing sulphur dioxide in an acid aqueous medium containing iron salts whose concentration is kept below that which would cause a separation of double salts of ammonium sulphate and iron sulphate, substantially neutralizing the sulphuric acid formed with ammonia and recovering solid ammonium sulphate.

12. A continuous process for the production of ammonium sulphate which comprises the steps of oxidizing sulphur dioxide in an acid aqueous medium in the presence of a soluble metallic salt which remains in solution when the solution is acid and whose hydroxide in relatively insoluble in an alkaline medium, substantially neutralizing the sulphuric acid formed with ammonia, recovering solid ammonium sulphate, and thereafter returning the solution for the further production of ammonium sulphate.

13. A process for the production of ammonium sulphate which comprises oxidizing sulphur dioxide-bearing gases mixed with oxygen-bearing gases in an acid aqueous medium in the presence of a soluble metallic salt, acting as a catalyst, which remains in solution when the solution is acid and whose hydroxide is relatively insoluble in an alkaline medium, substantially neutralizing the sulphuric acid formed with ammonia and recovering solid ammonium sulphate.

14. A process for the production of ammonium sulphate which comprises oxidizing sulphur dioxide in an acid aqueous medium in the presence of a soluble metallic salt, acting as a catalyst, which remains in solution when the solution is acid and whose hydroxide is relatively insoluble in an alkaline medium, maintaining the concentration of free acid below that which would cause a separation of an acid ammonium sulphate and above that which would cause the precipitation of insoluble compounds of the catalytic material, substantially neutralizing the sulphuric acid formed with ammonia and recovering solid ammonium sulphate.

15. A process for the production of ammonium sulphate which comprises bubbling sulphur dioxide and oxygen-containing gases through an acid aqueous medium in the presence of a soluble metallic salt, acting as a catalyst, which remains in solution when the solution is acid and whose hydroxide is relatively insoluble in an alkaline medium, maintaining the concentration of free acid below that which would cause a separation of an acid ammonium sulphate and above that which would cause the precipitation of insoluble compounds of the catalytic material, substantially neutralizing sulphuric acid formed with ammonia and recovering solid ammonium sulphate.

16. A process for the continuous production of ammonium sulphate which comprises continuously oxidizing sulphur dioxide in an acid aqueous medium while adding ammonia thereto in the presence of a soluble metallic salt, acting as a catalyst, which remains in solution when the solution is acid and whose hydroxide is relatively insoluble in an alkaline medium and continuously recovering solid ammonium sulphate.

17. A process for the continuous production of ammonium sulphate which comprises continuously oxidizing sulphur dioxide in an acid aqueous medium in the presence of a soluble metallic salt, acting as a catalyst, which remains in solution when the solution is acid and whose hydroxide is relatively insoluble in an alkaline medium, constantly maintaining the free acid concentration below that at which acid ammonium sulphate separates out, continuously adding ammonia thereto and continuously recovering solid ammonium sulphate.

LUDWIG ROSENSTEIN.